United States Patent Office 3,338,687
Patented Aug. 29, 1967

3,338,687
INFILTRATED COMPOSITE REFRACTORY
MATERIAL
Clayton D. Dickinson, Port Washington, Lawrence Sama, Seaford, and Irving Sheinhartz, Whitestone, N.Y., assignors to General Telephone and Electronics Laboratories, Inc., a corporation of Delaware
No Drawing. Filed June 16, 1965, Ser. No. 464,551
10 Claims. (Cl. 29—182.1)

This invention relates to an infiltrated composite refractory material and more particularly to an infiltrated oxidation resistant refractory material.

The present interest in space vehicles and high speed rocketry has generated a need for materials that are able to exhibit adequate mechanical properties at extremely high temperatures. In a typical application, such as solid propellant rocket nozzles, the flame temperatures generated have been found to exceed the melting points of commercially available refractory materials, such as tungsten.

As a result, rocket nozzles have been fabricated from a composite refractory material comprising generally a porous metallic refractory matrix of tungsten in which silver has been infiltrated. The matrix is infiltrated by molten silver during fabrication so that it is distributed throughout the voids of the matrix. At the high flame temperatures present in the rocket nozzles, the silver evaporates from the surface of the matrix with additional silver flowing to the surface from within the matrix. The evaporation of the infiltrant thereby maintains the refractory material at temperatures where it exhibits the desired mechanical properties.

However, the use of infiltrated refractory materials has heretofore been limited to non-oxidizing environments due to the poor oxidation resistance of the matrix material at these high temperatures. Although this limitation is not too severe in rocket nozzles which are located in a reducing atmosphere, it has prevented the use of infiltrated refractory materials in reentry vehicles and in the leading edges of supersonic aircraft.

Accordingly, non-metallic materials, such as various carbides, oxides and graphite, have been employed where high temperature operation in an oxidizing environment is anticipated. These materials have been found to exhibit many disadvantageous characteristics such as difficulty in fabrication, low resistance to thermal shock, the relative high cost of the materials, and the relatively large dimensional changes found to occur. The problem of dimensional changes due to air erosion is particularly serious at high speeds since a variation in dimension results in a corresponding change in the aerodynamic properties of the space vehicle.

Accordingly an object of the present invention is the provision of an infiltrated oxidation resistant refractory material.

A further object is to provide an evaporation-cooled oxidation resistant refractory material wherein the dimensional changes during high temperature usage are minimized.

Still another object is to provide an infiltrated composite refractory material having a high resistance to thermal shock.

In the present invention, a porous matrix is formed of a refractory metal or a refractory metal alloy. This matrix is then infiltrated with an alloy that is non-reactive with and has a substantially lower melting temperature than the matrix material.

The infiltrant alloy, which comprises a coating material and a diluent, is distributed throughout the porous matrix so that at temperatures below the melting point of the alloy the composite material is a filled solid with substantially no voids. When the composite material is exposed to increasing temperatures, such as that encountered by space vehicles reentering the atmosphere, the infiltrant alloy within the matrix melts.

At the surface of the composite material, the melted alloy flows from the exposed pores of the matrix and covers the material surface. The oxygen in the environment reacts with the coating material of the alloy to form a protective coating on the composite material. This protective coating inhibits erosion or other dimensional changes in the shape of the composite material and in addition prevents the matrix material from being oxidized.

As the protective coating is being formed, the diluent is vaporized at the surface of the composite material to provide evaporation cooling. If the free energy of formation of the protective coating formed by the coating material is substantially higher than for oxides of the diluent, the coating material reacts with the environmental oxygen and reduces any diluent oxides that may be formed. This enhances the evaporation cooling since essentially all of the diluent is vaporized.

At high temperatures, the alloy within the porous matrix is liquid and is drawn to the surface of the composite material to provide continuous evaporation cooling and to insure that a stable uneroded protective barrier against oxygen penetration is maintained. The pores of the matrix have been found to permit essentially continuous flow of the alloy at high temperatures. While not fully understood, it is believed that the pressure of the expanding alloy within the matrix is sufficient to prevent the protective coating from being formed over the pores and impeding the flow of the infiltrant alloy at the surface. The failure to provide unimpeded flow paths for the infiltrant results in the erosion or possible melting of the matrix material due to the lack of evaporation cooling and erosion of the protective coating.

The porous matrix is formed of a refractory metal such as tungsten, tantalum, molybdenum, niobium, vanadium, or rhenium, or refractory metal alloy containing one of the above. The coating material is required to provide a stable protective barrier on the surface of the matrix. In addition, the coating material must not react rapidly with the matrix material in order to inhibit the formation of an intermetallic compound tending to degrade the mechanical properties of the matrix material.

The diluent is required to form a low melting temperature alloy with the coating material so that the alloy readily becomes a liquid. Also, the diluent should have a boiling temperature such that it does not vaporize prior to reaching the matrix surface and must be substantially non-reactive with the matrix material throughout the environmental temperature range. In addition, the diluent must form oxides with a lower free energy of formation than the coating material to insure that evaporation cooling is provided at the surface.

It has been found that these requirements can be satisfied by selecting the diluent from the group consisting of tin, copper, gold and silver and the coating material from the group consisting of aluminum, silicon, hafnium and zirconium. In addition, the coating material should not exceed 50 weight percent of the alloy to insure that sufficient evaporation cooling is provided at the surface of the composite material and to retard any reaction of the coating material with the matrix. However, the material must exceed 2 weight percent of the infiltrant alloy to provide the necessary protective barrier. The preferred range for the coating material has been found to be from 10 to 25 weight percent of the alloy.

In the fabrication of several samples of the infiltrated composite refractory material, tungsten powder having an average particle size of 6 microns was compacted in a die at a pressure of about 20 tons per square inch. The compact was then removed from the die and sintered in hydrogen for about 6 hours at 1800° C. to form the refractory matrix. The porosity of the resultant matrix was found to be 20 to 25 percent of the total volume.

In a particular application, the desired mechanical properties determine the particle size, compacting pressure and sintering temperature. However, care must be taken to insure that the pores of the matrix are interconnected to permit effective infiltration.

The matrix so formed is then immersed in the liquid infiltrant. The infiltrant alloy fills the voids of the porous matrix due to capillary action. The melting temperature of the alloy is substantially less than the melting point of the matrix, which for tungsten is about 3000° C. The time required for filling 95 percent of the voids with the liquid alloy is found to be about one hour.

The temperature to be maintained during the infiltration is dependent on the alloy employed and its composition. The melting temperature of the tin-aluminum alloy having a composition within the preferred range of 10 to 25 weight percent aluminum resides within the range of 250 to 650° C. the corresponding range of infiltration temperatures was found to be between 400 and 1000° C.

In addition, the melting temperature of the copper-silicon alloys having a composition within the preferred range of 10 to 25 weight percent silicon resides within the range 800 to 1000° C. The corresponding range of infiltration temperatures was found to be between 950 and 1150° C.

When infiltration has been completed, the composite material is removed from the liquid alloy bath and cooled to room temperature whereupon the infiltrant becomes solidified. The actual rate of cooling has been found not to materially affect the properties of the composite material. At this point, the material may be readily machined to the desired tolerances.

To further improve the properties of the present material, it has been found advantageous in certain applications to add a small amount of chromium, about one weight percent, to the alloy. The addition of the chromium results in an increased adherence of the protective barrier to the matrix material. This has been found to further inhibit the oxidation of the matrix material.

The improved properties exhibited by these composite refractory materials are shown by the following results of oxidation tests conducted at ambient pressures in a resistance heated furnace on tungsten matrices infiltrated with tin-aluminum alloys.

| Matrix Density (percent) | Infilt. Comp. (weight percent) | Test Conditions | | Weight Gain (mg./cm.²) |
|---|---|---|---|---|
| | | Temp.,° F. | Time/Hrs. | |
| 80 | Sn–10 Al | 2,500 | 4 | 1.5 |
| 77.7 | Sn–15 Al | 2,550 | 4 | 1.2 |
| 80.3 | Sn–25 Al | 2,500 | 1 | 1.6 |
| 77.7 | Sn–25 Al | 2,500 | 4 | 2.9 |
| 78.2 | Sn–25 Al | 2,500 | 8 | 3.4 |
| 78.2 | Sn–25 Al | 2,500 | 16 | 3.7 |
| 76.6 | Sn–25 Al, – Cr | 2,500 | 1 | 0.4 |
| 75.2 | Sn–25 Al, – Cr | 2,500 | 4 | 2.6 |

The above-tested samples showed no visual evidence of failure, either macroscopically or microscopically. And in view of the very low weight gains pre exposed surface area, it is apparent that these composite refractory materials are quite resistant to oxidation.

Additional tests on a tungsten matrix were performed under the extremely high heat flux conditions of an electric plasma arc which provided a jet of high temperature air that was directed at one end of the sample. The results of the following tests are expressed in terms of the percent of weight loss due to volatization and erosion of the surface of the sample per unit time.

| Infiltrant Composition (weight percent) | Test Conditions | | Weight Difference (percent) | ΔLength/Time (mils/sec.) |
|---|---|---|---|---|
| | Heat Flux (B.t.u./ft.²-sec.) | Time (ssc). | | |
| Sn–20 Al | 700 | 60 | 1.19 | –0.02 |
| Sn–20 Al | 2,700 | 30 | 10.81 | 2.27 |
| Cu–10 Si | 700 | 60 | 2.98 | 0.28 |

The results of the dynamic tests clearly point out the resistance to erosion of the infiltrated materials as shown by the small dimensional changes found to occur. The increases in weight noted are due primarily to the formation of the protective barrier. Further, none of the above-tested samples showed evidence of failure indicating the ability of the infiltrated composite refractory material to withstand thermal shock.

As many modifications may be made in the above procedures and materials, it is intended that the foregoing description be interpreted in an illustrative rather than limiting sense.

What is claimed is:

1. An infiltrated composite refractory material for use in high temperature environments comprising:
   (a) a porous metallic refractory matrix, and
   (b) an infiltrant alloy having a melting temperature substantially lower than that of said matrix and distributed throughout the pores of said matrix, said alloy consisting substantially of a diluent and a coating material, said coating material being within the range of 2 to 50 weight percent of said alloy and reacting with said environment at high temperatures to form a protective coating on the surface of said matrix, said diluent being selected to form compounds with said environment having a lower free energy of formation than that of said protective coating whereby said diluent is vaporized at the surface of said matrix to provide evaporation cooling thereof.

2. An infiltrated composite refractory material for use in high temperature environments comprising:
   (a) a porous metallic refractory matrix, and
   (b) an infiltrant alloy having a melting temperature substantially lower than that of said matrix and distributed throughout the pores of said matrix, said alloy consisting substantially of a diluent and a coating material, said coating material being within the range of 10 to 25 weight percent of said alloy and reacting with said environment at high temperatures to form a protective coating on the surface of said matrix, said diluent being selected to form compounds with said environment having a lower free energy of formation than that of said protective coating whereby said diluent is vaporized at the surface of said matrix to provide evaporation cooling thereof.

3. An infiltrated composite refractory material for use in high temperature oxidizing environments comprising:
   (a) a porous metallic refractory matrix, and
   (b) an infiltrant alloy having a melting temperature substantially lower than that of said matrix and distributed throughout the pores of said matrix, said alloy consisting substantially of a diluent and a coating material, said coating material being within the range of 10 to 25 weight percent of said alloy and reacting with said environment at high temperatures to form a protective oxide coating on the surface of said matrix, said diluent being selected to form oxides having a lower free energy of formation than that of said protective oxide coating whereby said diluent is vaporized at the surface of said matrix to provide evaporation cooling thereof.

4. An infiltrated composite refractory material for use in high temperature oxidizing environments comprising:
(a) a porous metallic refractory matrix, and
(b) an infiltrant alloy having a melting temperature substantially lower than that of said matrix and distributed throughout the pores of said matrix, said alloy consisting substantially of a diluent selected from the group consisting of tin, copper, silver and gold, and an oxide forming material selected from the group consisting of aluminum, silicon, hafnium and zirconium, said oxide forming material being within the range of 2 to 50 weight percent of said alloy and reacting with said environment at high temperatures to form a protective oxide coating on the surface of said matrix, said diluent being selected to form oxides having a lower free energy of formation than that of said protective oxide coating whereby said diluent is vaporized at the surface of said matrix to provide evaporation cooling thereof.

5. An infiltrated composite refractory material for use in high temperature oxidizing environments comprising:
(a) a porous metallic matrix, said matrix containing a refractory metal selected from the group consisting of tungsten, molybdenum, tantalum, niobium, vanadium and rhenium, and
(b) an infiltrant alloy having a melting temperature substantially lower than that of said matrix and distributed throughout the pores of said matrix, said alloy consisting substantially of a diluent selected from the group consisting of tin, copper, silver and gold, and an oxide forming material selected from the group consisting of aluminum, silicon, hafnium and zirconium, said oxide forming material being within the range of 10 to 25 weight percent of said alloy and reacting with said environment at high temperatures to form a protective oxide coating on the surface of said matrix, said diluent being selected to form oxides having a lower free energy of formation than that of said protective oxide coating whereby said diluent is vaporized at the surface of said matrix to provide evaporation cooling thereof.

6. An infiltrated composite refractory material for use in high temperature oxidizing environments comprising:
(a) a porous metallic matrix, said matrix containing a refractory metal selected from the group consisting of tungsten, molybdenum, tantalum, niobium, vanadium and rhenium, and
(b) an infiltrant alloy having a melting temperature substantially lower than that of said matrix and distributed throughout the pores of said matrix, said alloy consisting substantially of aluminum and tin, said aluminum being within the range of 2 to 50 weight percent of said alloy and reacting with said environment at high temperatures to form a protective coating on the surface of said matrix while said tin is being vaporized at the surface of said matrix to provide essentially continuous evaporation cooling thereof.

7. An infiltrated composite refractory material for use in high temperature oxidizing environments comprising:
(a) a porous metallic matrix, said matrix containing a refractory metal selected from the group consisting of tungsten, molybdenum, tantalum, niobium, vanadium and rhenium, and
(b) an infiltrant alloy having a melting temperature substantially lower than that of said matrix and distributed throughout the pores of said matrix, said alloy consisting substantially of silicon and copper, said silicon being within the range of 2 to 50 weight percent of said alloy and reacting with said environment at high temperatures to form a protective coating on the surface of said matrix while said copper is being vaporized at the surface of said matrix to provide essentially continuous evaporation cooling thereof.

8. An infiltrated composite refractory material for use in high temperature oxidizing environments comprising:
(a) a porous metallic refractory matrix, and
(b) an infiltrant alloy having a melting temperature substantially lower than that of said matrix and distributed throughout the pores of said matrix, said alloy consisting substantially of aluminum and tin, said aluminum being within the range of 10 to 25 weight percent of said alloy and reacting with said environment at high temperatures to form a protective coating on the surface of said matrix while said tin is being vaporized at the surface of said matrix to provide essentially continuous evaporation cooling thereof.

9. An infiltrated composite refractory material for use in high temperature oxidizing environments comprising:
(a) a porous metallic refractory matrix, and
(b) an infiltrant alloy having a melting temperature substantially lower than that of said matrix and distributed throughout the pores of said matrix, said alloy consisting substantially of silicon and copper, said silicon being within the range of 10 to 50 weight percent of said alloy and reacting with said environment at high temperatures to form a protective coating on the surface of said matrix while said copper is being vaporized at the surface of said matrix to provide essentially continuous evaporation cooling thereof.

10. An infiltrated composite refractory material for use in high temperature oxidizing environments comprising:
(a) a porous metallic refractory matrix, and
(b) an infiltrant alloy having a melting temperature substantially lower than that of said matrix and distributed throughout the pores of said matrix, said alloy consisting substantially of aluminum, chromium and tin, said chromium being about 1 weight percent of said alloy, said aluminum being within the range of 10 to 25 weight perceent of said alloy and reacting with said environment at high temperatures to form a protective coating on the surface of said matrix while said tin is being vaporized at the surface of said matrix to provide essentially continuous evaporation cooling thereof.

References Cited

UNITED STATES PATENTS

| 3,048,972 | 8/1962 | Barlow | 239—265.15 |
|---|---|---|---|
| 3,145,529 | 8/1964 | Maloof | 29—182.1 |
| 3,157,026 | 11/1964 | Lampert | 60—35.6 |
| 3,226,929 | 1/1966 | McKenna | 60—35.6 |

FOREIGN PATENTS

| 723,307 | 2/1955 | Great Britain. |
|---|---|---|
| 836,749 | 9/1960 | Great Britain. |

BENJAMIN R. PADGETT, *Primary Examiner.*

L. DEWAYNE RUTLEDGE, *Examiner.*

R. L. GRUDZIECKI, *Assistant Examiner.*